United States Patent
Schaaf et al.

(10) Patent No.: US 10,443,692 B2
(45) Date of Patent: *Oct. 15, 2019

(54) FLUID MOVEMENT SYSTEMS INCLUDING A CONTINUOUSLY VARIABLE TRANSMISSION

(71) Applicant: Orbital Traction, Ltd., Houston, TX (US)

(72) Inventors: Stuart A. Schaaf, Houston, TX (US); Michael P. Bujold, Royal Oak, MI (US); Joseph D. Kliewer, Houston, TX (US)

(73) Assignee: Orbital Traction, Ltd., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,716

(22) Filed: Jun. 25, 2018

(65) Prior Publication Data

US 2018/0306284 A1    Oct. 25, 2018

Related U.S. Application Data

(63) Continuation of application No. 15/256,175, filed on Sep. 2, 2016, now Pat. No. 10,006,526, which is a
(Continued)

(51) Int. Cl.
*F16H 15/50* (2006.01)
*F03D 15/10* (2016.01)
(Continued)

(52) U.S. Cl.
CPC ............. *F16H 15/503* (2013.01); *F03D 9/25* (2016.05); *F03D 15/00* (2016.05); *F03D 15/10* (2016.05);
(Continued)

(58) Field of Classification Search
CPC .......... F16H 15/503; F03D 9/25; F03D 15/00; F03D 15/10; F05B 2260/40311; Y02E 10/722; Y02E 10/725
(Continued)

(56) References Cited

U.S. PATENT DOCUMENTS 2,913,932 A    11/1959  Oehrli
2,959,070 A    11/1960  Flinn
(Continued)

FOREIGN PATENT DOCUMENTS

EP    0517675    12/1992
JP    01-195919    8/1989
(Continued)

OTHER PUBLICATIONS

International Search Report dated Jul. 13, 2010 of PCT Application No. PCT/US2010/021495, 3 pages.
(Continued)

*Primary Examiner* — J. Todd Newton
(74) *Attorney, Agent, or Firm* — Prol Intellectual Property Law, PLLC; H. Kenneth Prol

(57) ABSTRACT

A system has a pump with a power input, a power source and a continuously variable transmission (CVT) coupled to the power source and to the power input of the pump. The CVT transmits power from the power source to the pump. The CVT comprises a plurality of planetary members in rolling contact with an inner race and an outer race. A radial distance between the planetary members and a drive-transmitting member corresponds to a transmission ratio of the CVT.

20 Claims, 7 Drawing Sheets

Related U.S. Application Data continuation of application No. 13/145,863, filed as application No. PCT/US2010/021495 on Jan. 20, 2010, now Pat. No. 9,464,701.

(60) Provisional application No. 61/146,603, filed on Jan. 22, 2009.

(51) Int. Cl.
*F03D 9/25* (2016.01)
*F03D 15/00* (2016.01)

(52) U.S. Cl.
CPC ... *F05B 2260/40311* (2013.01); *Y02E 10/722* (2013.01); *Y02E 10/725* (2013.01)

(58) Field of Classification Search
USPC .................................................. 123/559.1
See application file for complete search history.

(56) References Cited

U.S. PATENT DOCUMENTS

| | | | |
|---|---|---|---|
| 3,327,566 | A | 6/1967 | Hewko |
| 4,764,156 | A | 8/1988 | Ohkumo |
| 5,944,049 | A | 8/1999 | Beyer |
| 6,461,268 | B1 | 10/2002 | Milner |
| 6,676,560 | B1 * | 1/2004 | Buelna ............... F16H 15/20 476/47 |
| 2002/0053802 | A1 | 5/2002 | Makino |
| 2004/0171452 | A1 | 9/2004 | Miller |
| 2004/0262043 | A1 | 12/2004 | Schuaf |
| 2005/0113202 | A1 | 5/2005 | Miller |
| 2005/0198957 | A1 | 9/2005 | Kim |
| 2006/0154775 | A1 | 7/2006 | Ali |
| 2006/0188364 | A1 | 8/2006 | Fritz |
| 2007/0049450 | A1 | 3/2007 | Miller |
| 2007/0142161 | A1 * | 6/2007 | Miller ............... B60K 6/26 476/4 |
| 2007/0155580 | A1 * | 7/2007 | Nichols ............... F16H 15/28 476/36 |
| 2009/0189397 | A1 * | 7/2009 | Miller ............... B62M 11/12 290/55 |
| 2009/0236854 | A1 * | 9/2009 | Tseng ............... F16H 37/084 290/52 |
| 2010/0137094 | A1 * | 6/2010 | Pohl ............... F16H 15/52 475/149 |
| 2010/0173743 | A1 * | 7/2010 | Nichols ............... F16H 15/52 476/38 |
| 2010/0267510 | A1 * | 10/2010 | Nichols ............... B62M 11/16 475/189 |
| 2011/0218072 | A1 * | 9/2011 | Lohr ............... F16H 15/28 475/185 |
| 2012/0178566 | A1 * | 7/2012 | Yang ............... F16H 3/72 475/4 |
| 2012/0231911 | A1 * | 9/2012 | Yang ............... F16H 3/721 475/4 |
| 2013/0043686 | A1 * | 2/2013 | Eitan ............... F03D 9/255 290/55 |
| 2014/0329637 | A1 * | 11/2014 | Thomassy ............... F16H 15/52 476/38 |
| 2016/0201652 | A1 * | 7/2016 | Govind ............... F03D 80/88 416/1 |

FOREIGN PATENT DOCUMENTS

| | | |
|---|---|---|
| JP | 03-246321 | 11/1991 |
| JP | 06-174035 | 6/1994 |
| JP | 2004162652 A * | 6/2004 |

OTHER PUBLICATIONS

Extended European Search Report dated Aug. 25, 2016 of EP Application No. 10733805.5, 13 pages.

* cited by examiner ions. For example, superchargers can force more air into an
FLUID MOVEMENT SYSTEMS INCLUDING A CONTINUOUSLY VARIABLE TRANSMISSION

CROSS-REFERENCE TO RELATED APPLICATIONS

This application is a National Stage Entry under 37 C.F.R. § 371 of International Patent Application No. PCT/US2010/021495, filed on Jan. 20, 2010, which claims priority of U.S. Provisional Application No. 61/146,603, filed on Jan. 22, 2009, the disclosures of which are hereby expressly incorporated by reference in their entirety.

This application is a continuation of prior application Ser. No. 15/256,175, entitled "Fluid Movement Systems Including a Continuously Variable Transmission," filed on Sep. 2, 2016, which is a continuation of U.S. patent application Ser. No. 13/145,863, entitled "Fluid Movement Systems Including a Continuously Variable Transmission," filed on Oct. 3, 2011, now issued U.S. Pat. No. 9,464,701, issued Oct. 11, 2016, the disclosures of which are hereby expressly incorporated by reference in their entirety.

FIELD OF THE DISCLOSURE

This disclosure relates generally to fluid movement systems including a continuously variable transmission.

BACKGROUND

Fluid movement systems can be used in various applications. For example, superchargers can force more air into an engine combustion chamber than the engine would typically draw when normally aspirated. As a result, a smaller displacement engine can produce increased power while maintaining fuel efficiency when such increased power is not required. Fluid movement systems can also take the form of turbines powered by wind, water, or other fluids. In addition, semiconductor processing and other chemical processing techniques can benefit from vacuum systems designed to achieve relatively low pressures by removing gases or other fluids from processing or other chambers.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION OF THE DRAWINGS

Figure 1:
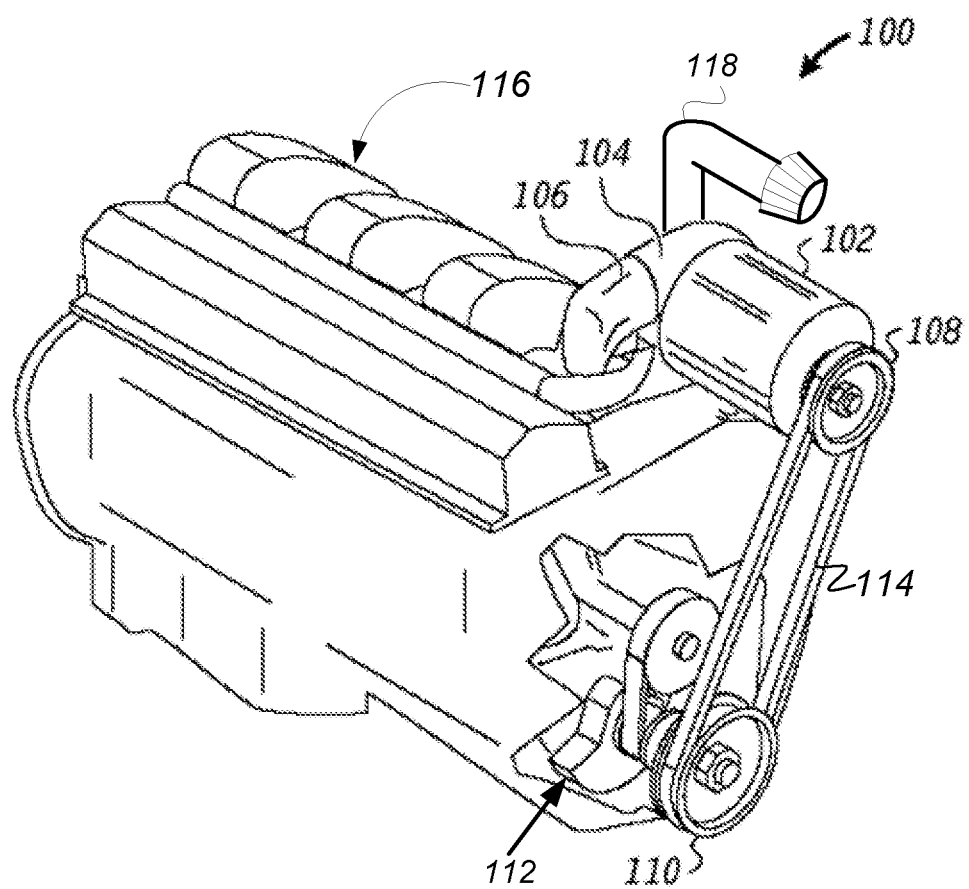
FIG. 1 is a diagram illustrating a particular embodiment of a fluid movement system.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of systems and associated components.

Devices that are in operative communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the mechanical, chemical and electrical arts.

FIG. 1 illustrates a particular embodiment of a fluid movement system 102. The fluid movement system 102 can be included within a power generation system, such as an internal combustion engine 100 (e.g., a gasoline or diesel engine). The fluid movement system 102 includes a pump, such as a forced induction system. In one embodiment, the forced induction system can include a supercharger, such as the supercharger 203 illustrated in FIG. 2, having an output 104. The supercharger 203 can also include an air intake portion 206, which may be coupled to a cool air intake system 118 or other air intake. In one example, the forced induction system can include a centrifugal supercharger. In another example, the forced induction system can include a screw-type supercharger or a roots supercharger.

In another embodiment, the forced induction system can include a turbocharger. In a further embodiment, the forced induction system can include both a supercharger and a turbocharger.

The fluid movement system 102 also includes a power source that transfers power from the internal combustion engine 100 to the fluid movement system 102. For example, energy produced from the rotation of an engine crankshaft 112 is transferred to a drive pulley 108 by the crankshaft pulley 110. The drive pulley 108 acts as a power source for the fluid movement system 102 by transferring to the CVT energy that the drive pulley 108 receives from the engine 100 via the crankshaft pulley 110 and drive belt 114. In other examples, the power source that transfers power from the internal combustion engine 100 to the fluid movement system 102 can include the drive pulley 108; the crankshaft pulley 110; the engine crankshaft 112, an engine camshaft (not shown); another power source; or any combination thereof.

Figure 2:
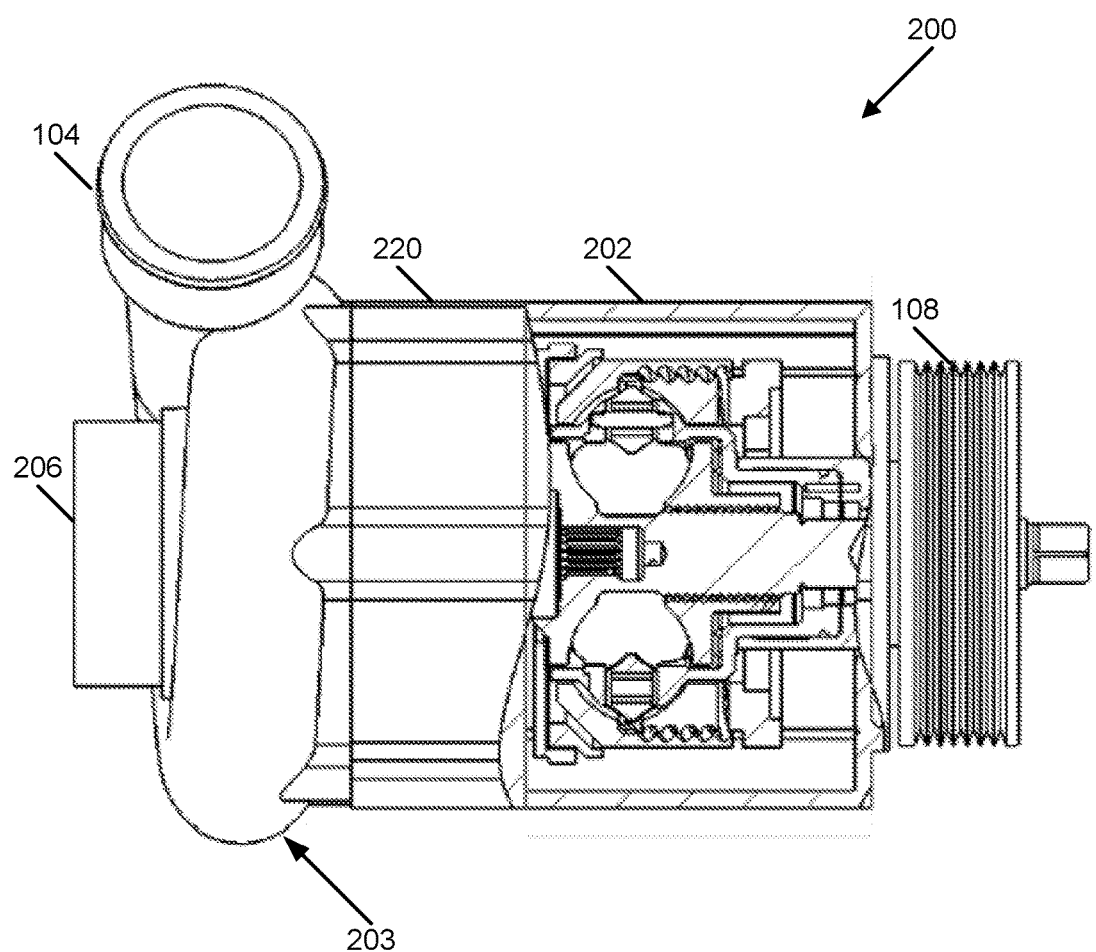
FIG. 2 includes a cut-away view illustrating another particular embodiment of a fluid movement system.
Figure 3:
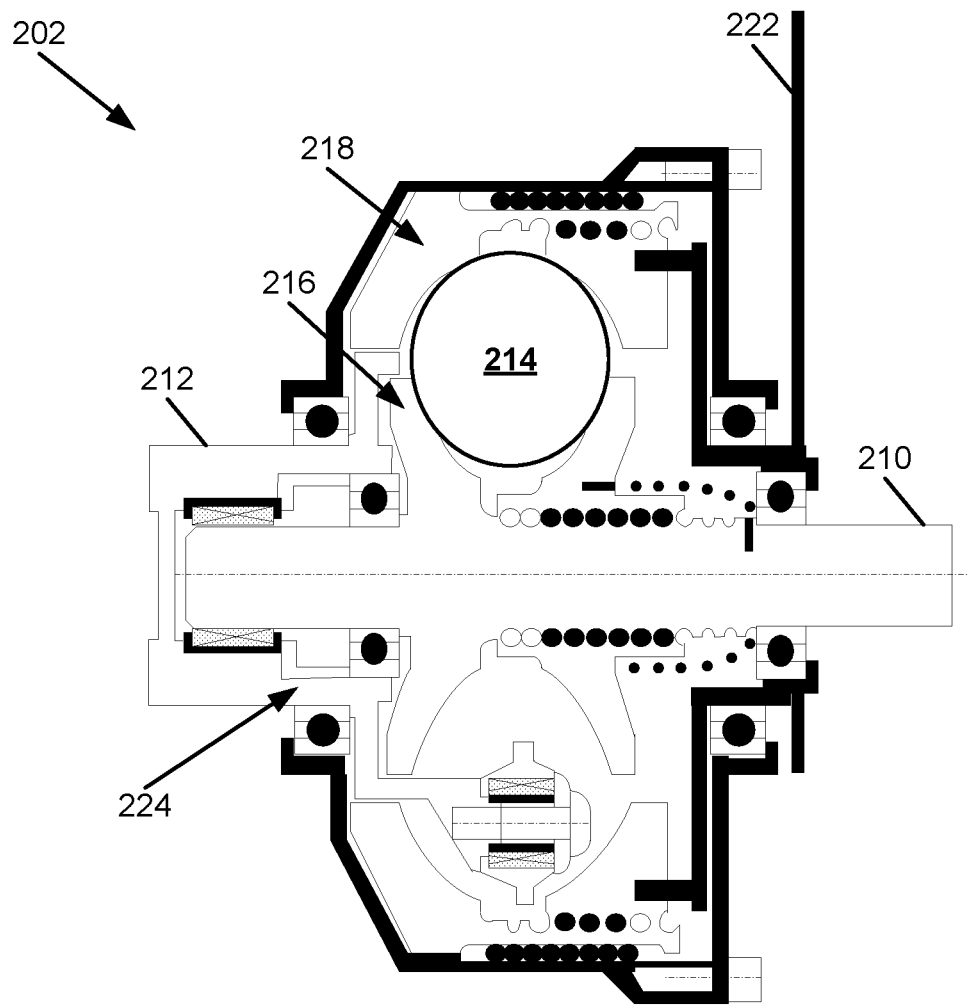
FIG. 3 is a diagram illustrating a particular embodiment of a continuously variable transmission (CVT), such as the CVT illustrated in FIG. 2.

Further, the fluid movement system 102 includes a continuously variable transmission (CVT), such as the CVT 202 illustrated in FIG. 2 and FIG. 3, which transmits power from the power source to the forced induction system. The CVT is coupled to the power source, such as the engine drive pulley 108, and to an input (not shown) of the forced induction system. For example, a shaft 210, such as an input shaft of the CVT 202, can be coupled to the engine drive pulley 108. Another shaft 212, such as an output shaft of the CVT 202, can be coupled to the input of the supercharger 203. In one embodiment, another apparatus 220, such as an epicyclical in the form of a gear assembly or traction drive, may be coupled between the CVT 202 and the supercharger 203, and the other shaft 212 can be coupled to the input of the supercharger 203 via the other apparatus 220. After reading the specification, skilled artisans will understand that other components (e.g., air filter, mass flow sensors, etc.) may be used in conjunction with the internal combustion engine 100 but are not illustrated to simplify understanding of the concepts described herein.

The CVT can include various structures and architectures. For example, in the embodiment illustrated in FIG. 2 and FIG. 3, the CVT 202 comprises planetary members 214, such as ball bearings, in rolling contact with an inner race 216 and an outer race 218, such as a control ratio outer race. Output rotation and torque can be provided through a carrier 224, where power flows from the shaft 210 to the carrier 224 through the planetary members 214 that orbit the shaft 210. A radial distance between the planetary members 214 and a drive-transmitting member, such as the other shaft 212, corresponds to a particular transmission ratio of the CVT 202. In a particular embodiment, the CVT 202 can be a CVT as taught by U.S. Pat. No. 6,461,268, which is incorporated by reference in its entirety.

The power transmitted by the CVT 202 to the forced induction system can be set by changing transmission of power among the inner race 216, outer race 218, carrier 224 and planetary members 214, relative to each other. For example, an amount of power transmitted by the CVT 202 to the forced induction system can be changed by transmitting power from the inner race 216 to the carrier 224, while the outer race 218 has substantially zero rotational velocity. In another example, an amount of power transmitted by the CVT 202 to the forced induction system can be changed by transmitting power from the outer race 218 to the carrier 224, while the inner race 216 has substantially zero rotational velocity. In still another example, an amount of power transmitted by the CVT 202 to the forced induction system can be changed by transmitting power from the inner race 216 to the outer race 218, while the carrier 224 has substantially zero rotational velocity. Those skilled in the art will recognize that a component of the CVT may change axially despite having has substantially zero rotational velocity.

The CVT can be characterized by various gear ratio ranges. In an illustrative, non-limiting example, the CVT can have a gear ratio of from approximately 0.5:1 to at least approximately 4:1, such as from approximately 1:1 to approximately 4:1, from approximately 0.5:1 to approximately 2.5:1, or from approximately 1:1 to approximately 2.5:1. Other gear ratios are possible, including gear ratios greater than 4:1, such as 15:1 or greater. In one embodiment, the CVT can include a ratio change mechanism, such as the ratio change lever 222 illustrated in FIG. 3, that tunes the transmission ratio to match the air output of the forced induction system to an engine condition, such as a manifold pressure, by changing the relative geometry of the CVT components 214, 216 and 218. The ratio change mechanism can be electrical, hydraulic, mechanical, or any combination thereof.

In an illustrative embodiment, the CVT can increase or reduce power transmitted to the input of the forced induction system in response to air pressure at an intake manifold 116 of the engine 100. For example, the control electronics (not illustrated) can communicate with a pressure sensor (not shown) that senses the manifold pressure. The control electronics can generate an appropriate signal so that the CVT can reduce power transmitted to the forced induction system when the pressure sensor senses that the manifold pressure is above a threshold, such as a maximum desired pressure, and increase power transmitted to the forced induction system when the pressure sensor senses that the manifold pressure is below another threshold, such as a minimum desired pressure.

As illustrated in FIG. 1, an output 104 of the forced induction system is coupled to an air intake of the internal combustion engine 100, such as an input 106 of the intake manifold 116. The forced induction system boosts the manifold pressure in response to power received from the CVT, by forcing more air from the input 206 of the force induction system into the engine 100 via the output 104, than typically moved into the engine 100 by normal aspiration of the engine. In one embodiment, the forced induction system can boost the manifold pressure by at least approximately 41000 Pascal gauge (6 pounds force/inch2 gauge or psig). In another embodiment, the forced induction system boosts the manifold pressure by at least approximately 62000 Pascal gauge (9 psig). In yet another embodiment, the forced induction system can include both a turbocharger and a supercharger and can boost the manifold pressure by a total of at least approximately 206,000 Pascal gauge (30 psig).

Figure 7:
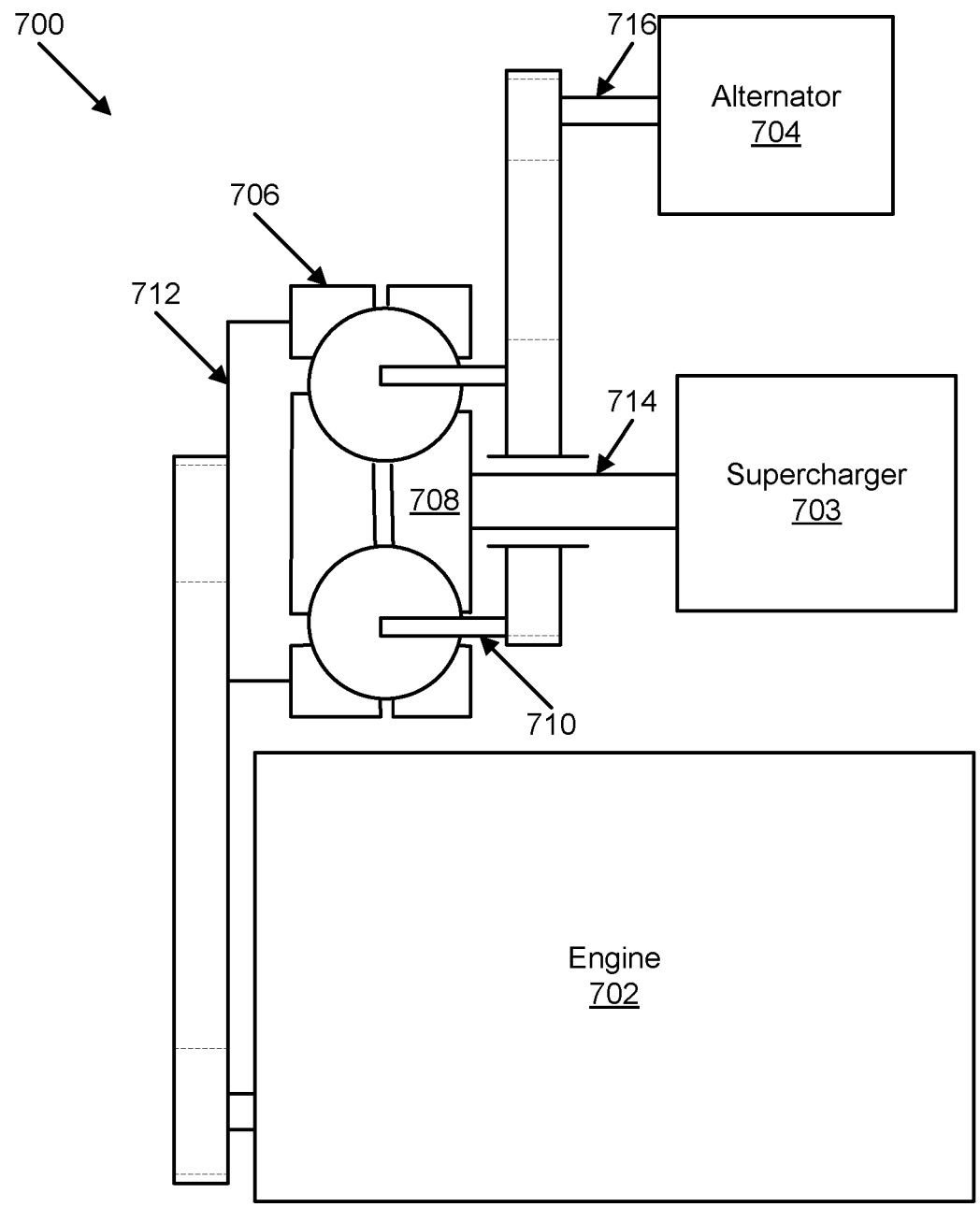
FIG. 7 is a diagram illustrating a further particular embodiment of a fluid movement system.

Those skilled in the art will recognize that other continuously variable transmission architectures may be used with other systems. For instance, the CVT can be combined with an epicyclical gearbox to effectively provide an infinitely variable transmission (IVT). In another example, rotatable power elements can be coupled to the inner race, the outer race, the carrier, or any combination thereof, such that two or more devices can be driven by the CVT. As illustrated in FIG. 7, a rotatable power element 712 coupled to the CVT outer race 706 can be connected to and driven by the engine 702 (e.g., via an engine drive pulley), while another rotatable power element 716 coupled to the CVT carrier 710 is connected to and drives an alternator 704, and an additional rotatable power element 714 coupled to the CVT inner race 708 is connected to and drives the supercharger 703.

Figure 4:
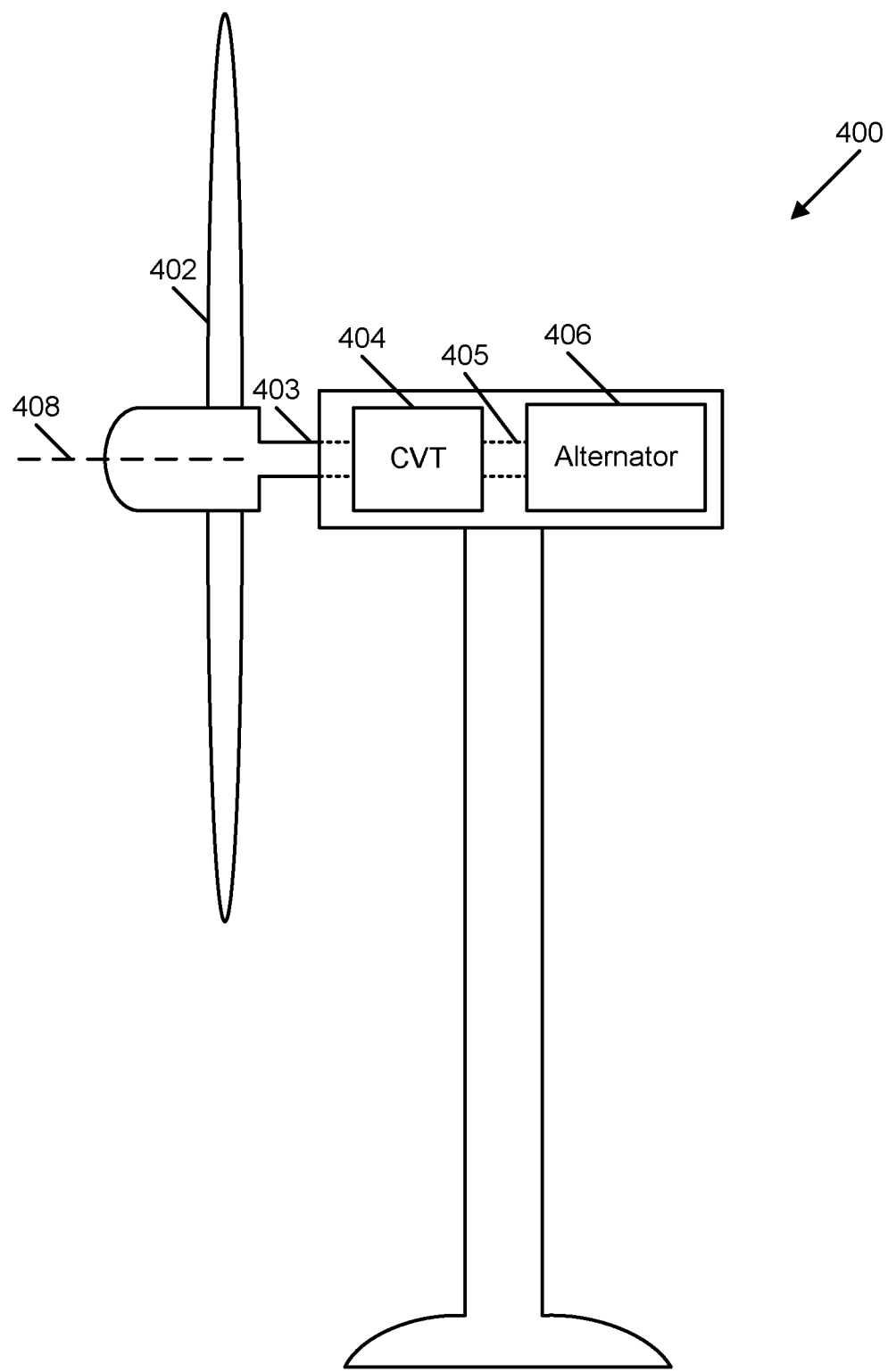
FIG. 4 is a diagram illustrating a further particular embodiment of an energy generation system.

FIG. 4 illustrates a further particular embodiment of an energy generation system 400, such as a horizontal turbine system. The system 400 includes a blade 402 coupled to a rotor 403. The blade 402 causes the rotor 403 to rotate about an axis 408 when fluid, such as air or water (e.g., wind, rain, or tide), exerts a force on the blade 402. A continuously variable transmission (CVT) 404 is also coupled to the rotor 403. An electrical power generator, such as the alternator 406, is coupled to the CVT 404 via another rotor 405. The CVT 404 transmits power from the rotor 403 to the other rotor 405.

For example, the blade 402 may cause the rotor 403 to turn at a rate of from 10-25 revolutions per minute (rpm) in response to wind or another fluid exerting a continuous or non-continuous force on the blade 402. The CVT 404 converts the rotation of the rotor 403 into power that causes the other rotor 405 to rotate at a speed sufficient to cause the alternator 406 to produce an electrical current. In an illustrative embodiment, the alternator 406 may require that the other rotor 405 rotate at a speed of at least approximately 40,000 rpm. The CVT 404 alters its transmission ratio to transmit power sufficient to cause the other rotor 405 to rotate at a speed of at least 40,000 rpm. As the speed of the rotor 403 decreases, for instance, the CVT 404 transmission ratio can increase, and vice versa. The CVT 404 may also be beneficial during storms when winds or tides are high and during periods of relatively calm conditions. The CVT 404 may be used to adjust for variations in the velocity of the fluid flowing near the fluid movement system, rather than adjusting a blade pitch or other portion of the system.

Figure 5:
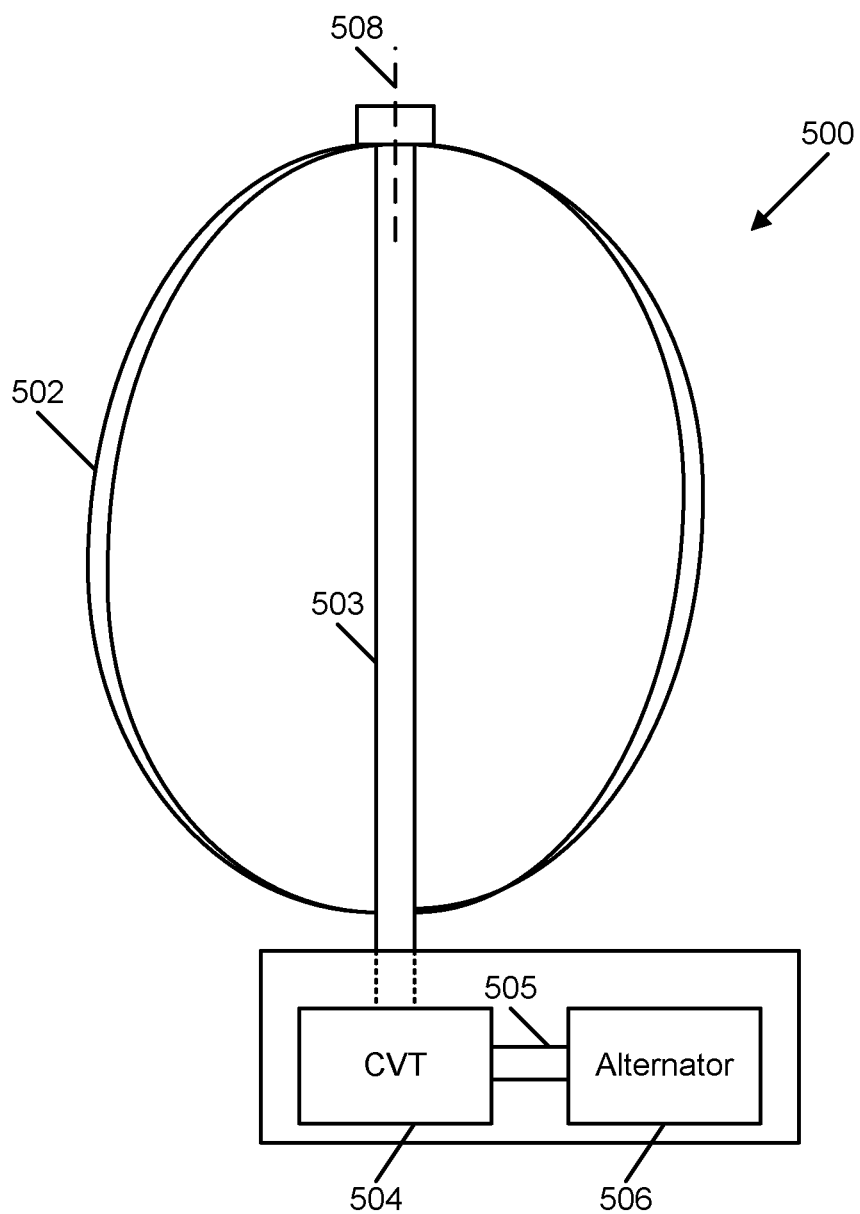
FIG. 5 is a diagram illustrating an additional particular embodiment of an energy generation system.

FIG. 5 illustrates an additional particular embodiment of a fluid movement system 500, such as a vertical turbine system. The system 500 includes a blade 502 coupled to a rotor 503. The blade 502 causes the rotor 503 to rotate about an axis 508 when fluid, such as air or water (e.g., wind, rain, or tide), exerts a force on the blade 502. A continuously variable transmission (CVT) 504 is also coupled to the rotor 503. An electrical power generator, such as the alternator 506, is coupled to the CVT 504 via another rotor 505. The CVT 504 transmits power from the rotor 503 to the other rotor 505. For example, the CVT 504 converts the rotation of the rotor 503 into power that causes the other rotor 505 to rotate at a speed sufficient to cause the alternator 506 to produce an electrical current.

Figure 6:
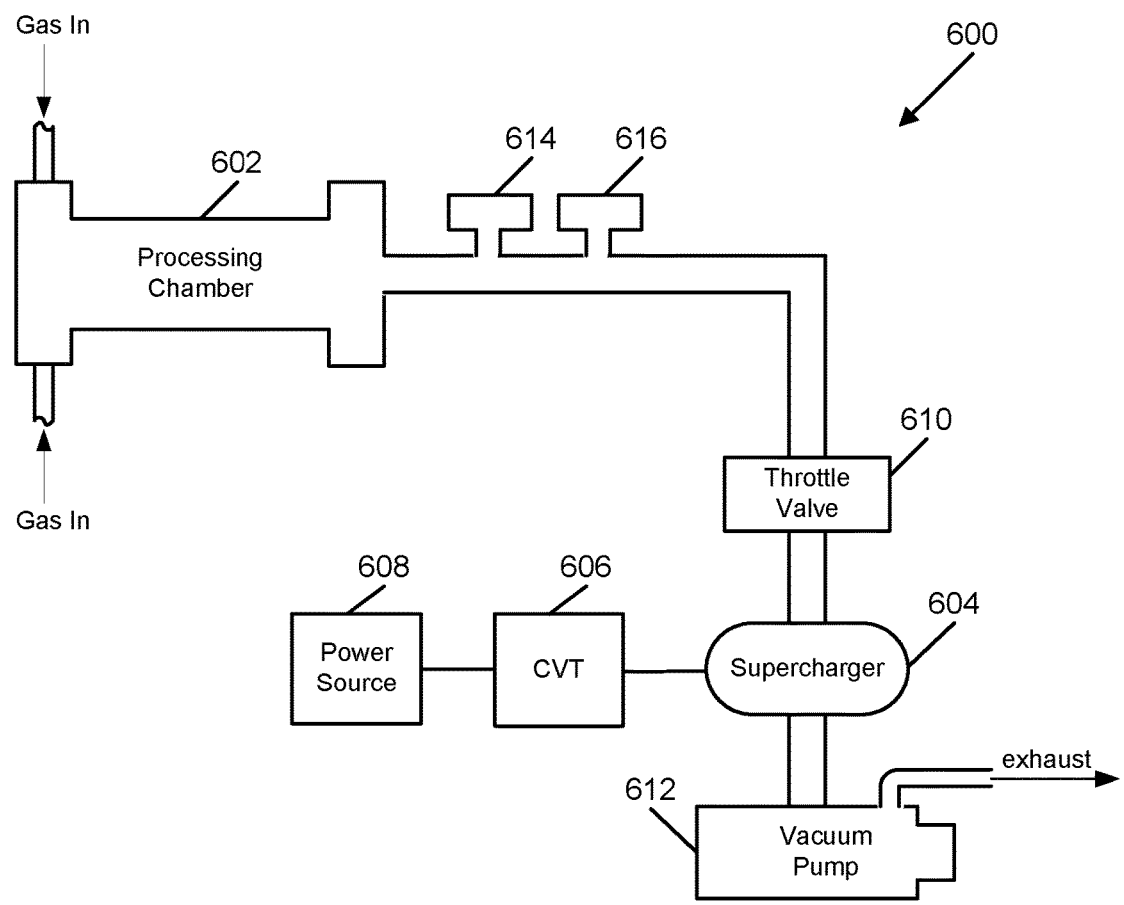
FIG. 6 is a diagram illustrating a particular embodiment of a vacuum system that includes a fluid movement system.

FIG. 6 illustrates a particular embodiment of a low-pressure processing system 600 that includes a fluid movement system. The low-pressure processing system 600 includes a processing chamber 602, such as a chemical or physical vapor deposition chamber, dry etch chamber, etc.), communicating with a vacuum pump 612 via a throttle valve 610. The low-pressure processing system 600 also includes a throttle valve 610 and a supercharger 604, such as a roots-type supercharger or other supercharger, coupled between the processing chamber 602 and the vacuum pump 612. In the embodiment illustrated in FIG. 6, the throttle valve 610 lies upstream (closer to the processing chamber 602) of the supercharger 604. In another embodiment (not illustrated), the positional relationship of the throttle valve 610 and supercharger 604 can be reversed (supercharger 604 upstream of the throttle valve 610). In addition, the low-pressure processing system 600 includes a continuously variable transmission (CVT) 606 coupled between the supercharger and a power source 608, such as an electric motor or another power source. The CVT 606 transmits power from the power source 608 to the supercharger 604 in a ration that corresponds to a pressure in the processing chamber 602. After reading the specification, skilled artisans will understand that other components (e.g., cold trap, particulate filter, isolation valves, gas feed lines, showerhead or other gas distributor with the processing chamber 602, etc.) may be used in conjunction with the processing system 600 but are not illustrated to simplify understanding of the concepts described herein.

In an illustrative embodiment, the CVT 606 can include an input shaft and an output shaft. The power source 608 causes the input shaft of the CVT 606 to rotate at a particular rate, and the CVT 606 causes the output shaft to rotate at another rate when the input shaft rotates at the particular rate. Rotation of the output shaft at the other rate draws a gas from the processing chamber at a flow rate. Gas exiting the processing chamber 602 at the flow rate causes a substantially constant pressure to be maintained within the processing chamber 602. For instance, a pressure in a range of approximately 50 mT to approximately 500 mT can be maintained within the processing chamber 602.

In a particular embodiment, control electronics (not illustrated) can communicate with a pressure switch 616 and a pressure sensor 614 that measures pressure in the processing chamber 602. When a pressure reaches a predetermined value, the pressure switch 616 can send a signal to the power source 608, the control electronics, or both. In response to a pressure reading from the pressure sensor, the control electronics can send a signal to the CVT 606 to transmit more power or less power to the supercharger 604, thereby drawing more or less gas from the processing chamber 602, respectively. For instance, if a pressure reading exceeds a threshold, such as a maximum desired pressure, the CVT 606 can transmit more power to the supercharger 604; whereas, if a pressure reading is below another threshold, such as a minimum desired pressure, the CVT 606 can transmit less power to the supercharger 604.

In a particular embodiment, an optional parallel fluid path (not illustrated) can allow gas to flow through the parallel fluid path until a first pressure is reached during initial evacuation of the processing chamber 602. For example, the vacuum pump 612 may be used to achieve a pressure at least as low as approximately 1000 mT. After the pressure is 1000 mT, the pressure switch 616 can be activated (or deactivated, depending on the logic signals used), which can cause the power source 608 to become activated and allow a fluid path to go through the supercharger 604. Thus, the supercharger 604, CVT 606, and power source 608 can be activated to reach an even lower pressure. The pressure may be taken to 100 mT or less using the supercharger 604 and vacuum pump 212. After a leak check is performed, a vapor deposition or dry etch can be performed. In a particular embodiment, tetraethylorthosilicate (TEOS) can be used to deposit a layer of SiO2. During the decomposition of TEOS or reaction with oxygen, the number of moles of gas produced from the deposition or reaction is larger than the number of moles of gas reactants. Thus, the supercharger 604 can help to keep the pressure within the processing chamber more constant (closer to a desired setpoint) than if the vacuum pump 612 alone (i.e., without the supercharger 604) would be used.

In another embodiment (not illustrated), the use of the CVT 606 with the supercharger 604 may allow the throttle valve 610 to be eliminated. In a particular embodiment, the power source 608 can provide a substantially constant amount of power when the power source 608 is activated. The CVT 606 can be used to change the rate at which the supercharger 604 is operating. For example, if the pressure sensor 614 is sensing that the pressure within the processing chamber 602 is too high, the control electronics can send a signal to the CVT 606 to change the gear ratio to cause the input shaft of the supercharger 608 to rotate at a higher rate, and if the pressure sensor 614 is sensing that the pressure within the processing chamber 602 is too low, the control electronics can send a signal to the CVT 606 to change the gear ratio to cause the input shaft of the supercharger 608 to rotate at a slower rate. Thus, a relatively constant power source can be used with a CVT that varies the rotational rate of the output shaft from the CVT.

In accordance with the various embodiments herein, a CVT coupled to a pump system is provided. The pump system can include any system that moves, draws, elevates, pulls, drives, exhausts, or compresses a gas or other fluid. Pump systems can include, for example, compressors (such as superchargers or other forced induction systems), airplane propellers, windmills, and other pump systems. In some embodiments, the pump can generate power or energy in response to movement of the fluid. For example, fluidic turbines, water turbines, and electric windmills can generate electrical power in response to air, water, or another fluid contacting a blade, vane or other surface that transmits energy to a rotor coupled to a CVT.

After reading this specification, skilled artisans will appreciate that the embodiments described herein illustrate only a few embodiments where a CVT can be used in conjunction with a fluid motion system. The power source to the CVT can be substantially constant or variable, and the CVT can be used to produce a substantially constant or variable output. Thus, the concepts described herein are flexible and can be adapted to a variety of different applications.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a fluid movement system can include a pump having a power input. The fluid movement system can also include a power source and a continuously variable transmission (CVT) coupled to the power source and to the input of the pump. The CVT can be adapted to transmit power from the power source to the pump. In one embodiment, the CVT can comprise a plurality of planetary members in rolling contact with an inner race and an outer race, where a radial distance between the planetary members and a drive-transmitting member corresponds to a transmission ratio of the CVT.

In one embodiment of the first aspect, the pump comprises a forced induction system, such as a turbocharger or supercharger. The supercharger can be a centrifugal supercharger.

In another embodiment of the first aspect, the CVT can be adapted to change the power transmitted to the pump by transmitting the power from the inner race to the carrier while holding the outer race at substantially zero rotational velocity. In an alternative embodiment of the first aspect, the CVT can be adapted to change the power transmitted to the pump by transmitting the power from the outer race to the carrier while holding the inner race at substantially zero rotational velocity. In yet another embodiment of the first aspect, the CVT includes a carrier, and wherein the CVT is adapted to change the power transmitted to the pump by transmitting the power from the inner race to the outer race while holding the carrier at substantially zero rotational velocity.

In another embodiment of the first aspect, the CVT includes a ratio change mechanism that is electrical, hydraulic or mechanical. In still another embodiment of the first aspect, the fluid movement system includes a pressure sensor adapted to sense a manifold pressure. The CVT is adapted to reduce power transmitted to the forced induction system when the pressure sensor senses that the manifold pressure is above a first threshold and to increase power transmitted to the forced induction system when the pressure sensor senses that the manifold pressure is below a second threshold.

In a further embodiment of the first aspect, the power source can include an engine crankshaft, a crankshaft pulley, or a combination thereof. In another embodiment of the first aspect, the power source can include an engine drive pulley.

In still another embodiment of the first aspect, the CVT includes an inner race, an outer race, and a carrier. Each of the inner race, the outer race, the carrier, or any combination thereof, is coupled to one of a plurality of rotatable power elements. In one example, the outer race is coupled to the power source via a first rotatable power element, the carrier is coupled to an alternator via a second rotatable power element, and the inner raced is coupled to the pump via a third rotatable power element.

According to a second aspect, a fluid movement system can include a surface coupled to a first rotor and a continuously variable transmission (CVT) coupled to the first rotor. The surface is adapted to transmit energy to the first rotor when a fluid contacts the surface. The fluid movement system also includes an electrical power generator having a second rotor, the second rotor coupled to the CVT. The CVT is adapted to transmit power from the first rotor to the second rotor.

In one embodiment of the second aspect, the surface can include a blade or a vane. In an additional embodiment of the second aspect, the electrical power generator comprises an alternator.

According to a third aspect, a fluid movement system includes a processing chamber and a vacuum pump. The fluid movement system also includes a supercharger coupled between the processing chamber and the vacuum pump. The fluid movement system also includes a continuously variable transmission (CVT) coupled between the supercharger and a power source.

In an embodiment of the third aspect, the processing chamber comprises a chemical vapor deposition chamber.

In another embodiment of the third aspect, the CVT includes an input shaft and an output shaft. The power source is adapted to cause the input shaft of the CVT to rotate at a first rate, and the CVT is adapted to cause the output shaft to rotate at a second rate when the input shaft rotates at the first rate. Rotation of the output shaft at the second rate draws a gas from the processing chamber at a flow rate, and gas exiting the processing chamber at the flow rate causes a substantially constant pressure to be maintained within the processing chamber. In a further embodiment of the third aspect, the pressure can be in a range of approximately 50 mT to approximately 500 mT. In yet another embodiment of the third aspect, the supercharger is a roots-type supercharger.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for power transmission comprising:
   a power source including a surface and a first rotatable power element where the surface transmits energy to the first rotatable power element when a fluid contacts the surface; and
   a continuously variable transmission (CVT) operatively coupled to the power source via the first rotatable power element and operatively coupled to a power input of a power generator, the CVT transmits power from the power source to the power generator, and the CVT comprises a plurality of planetary members in rolling contact with a rotatable inner race, a carrier and a rotatable outer race, a torque sensitive inclined plane surface integral to the rotatable inner race or the rotatable outer race, and wherein a radial distance between the plurality of planetary members and a drive-transmitting member corresponds to a transmission ratio of the CVT,
   wherein one of the rotatable inner race, the rotatable outer race, or the carrier is operatively coupled to the first rotatable power element, and another of the rotatable inner race, the rotatable outer race, or the carrier is operatively coupled to the power generator.

2. The system of claim 1, wherein the power source comprises a wind turbine blade system.

3. The system of claim 1, wherein the power source comprises a fluid turbine blade system.

4. The system of claim 1, wherein the power source comprises a water or water vapor turbine blade system.

5. The system of claim 1, wherein a one of the rotatable inner race, the rotatable outer race, or the carrier is operatively coupled to the power generator to generate electrical power.

6. The system of claim 5, wherein the power generator is an alternator system.

7. The system of claim 5, wherein a pump assists electrical power generation.

8. The system of claim 7, wherein the CVT changes the power transmitted to the pump by transmitting the power from the outer race to the inner race while holding the carrier at substantially zero rotational velocity.

9. A system for power transmission comprising:
   a power source including a first rotatable power element to transmit power from the power source via the first rotatable power element; and
   a continuously variable transmission (CVT) operatively coupled to the power source via the first rotatable power element and operatively coupled to a power generator via a second rotatable power element, the CVT transmits power from the power source to the power generator, and the CVT comprises a plurality of planetary members in rolling contact with a rotatable inner race, a carrier, and a rotatable outer race, a torque sensitive inclined plane surface integral to the rotatable inner race or the rotatable outer race, and wherein a radial distance between the plurality of planetary members and a drive-transmitting member corresponds to a transmission ratio of the CVT,
   wherein one of the rotatable inner race, the rotatable outer race, or the carrier is operatively coupled to the first rotatable power element, and another of the rotatable inner race, the rotatable outer race, or the carrier is operatively coupled to the second rotatable power element.

10. The system of claim 9, wherein the power source includes a surface and the surface transmits energy to the first rotatable power element when a fluid contacts the surface.

11. The system of claim 10, wherein the surface comprises a wind turbine blade system.

12. The system of claim 9, wherein the power source comprises an engine crankshaft, a crankshaft pulley, or a combination thereof.

13. The system of claim 9, wherein the power generator is an alternator system for generation of electrical power.

14. The system of claim 9, wherein the carrier is held at zero rotational velocity.

15. The system of claim 9, wherein a third of the rotatable inner race, the rotatable outer race, or the carrier is operatively coupled to a pump to assist in regulation of rotation of the second rotatable power element.

16. The system of claim 9, wherein the drive-transmitting member is operatively coupled to the second rotatable power element.

17. A system for power transmission comprising:
- a power source including a surface and a first rotatable power element, where the surface transmits energy to the first rotatable power element when a fluid contacts the surface; and
- a continuously variable transmission (CVT) operatively coupled to the power source via the first rotatable power element and operatively coupled to a power input of a power generator, the CVT transmits power from the power source to the power generator, and the CVT comprises a plurality of planetary members in rolling contact with a rotatable inner race, a carrier and a rotatable outer race, a torque sensitive inclined plane surface integral to the rotatable inner race or the rotatable outer race, and wherein a radial distance between the plurality of planetary members and a drive-transmitting member corresponds to a transmission ratio of the CVT,
- wherein one of the rotatable inner race, the rotatable outer race, or the carrier is operatively coupled to the first rotatable power element, and another of the rotatable inner race, the rotatable outer race, or the carrier is operatively coupled to the power generator.

18. The system of claim 17, wherein the surface is a blade of a wind turbine blade system.

19. The system of claim 17, wherein the drive-transmitting member is operatively coupled to the second rotatable power element.

20. The system of claim 17, wherein the third of the rotatable inner race, the rotatable outer race, or the carrier is operatively coupled to a pump to assist in electrical generation.

* * * * *